United States Patent
Tenuta

(10) Patent No.: US 9,323,365 B2
(45) Date of Patent: Apr. 26, 2016

(54) MASKING AN OUTER PERIMETER OF A TOUCH SCREEN

(71) Applicant: Google Inc., Mountain View, CA (US)

(72) Inventor: Matthew Dominic Tenuta, San Jose, CA (US)

(73) Assignee: Google Inc., Mountain View, CA (US)

( * ) Notice: Subject to any disclaimer, the term of this patent is extended or adjusted under 35 U.S.C. 154(b) by 140 days.

(21) Appl. No.: 13/891,133

(22) Filed: May 9, 2013

(65) Prior Publication Data

US 2014/0118274 A1    May 1, 2014

Related U.S. Application Data

(60) Provisional application No. 61/719,883, filed on Oct. 29, 2012.

(51) Int. Cl.
*G06F 3/041* (2006.01)

(52) U.S. Cl.
CPC ........... *G06F 3/041* (2013.01); *Y10T 29/49105* (2015.01)

(58) Field of Classification Search
CPC ...................................................... G06F 3/041
See application file for complete search history.

(56) References Cited

U.S. PATENT DOCUMENTS

| | | | |
|---|---|---|---|
| 7,812,827 B2 * | 10/2010 | Hotelling et al. | 345/173 |
| 7,859,521 B2 | 12/2010 | Hotelling et al. | |
| 8,730,415 B2 * | 5/2014 | Omote et al. | 349/12 |
| 2006/0097991 A1 | 5/2006 | Hotelling et al. | |
| 2008/0158167 A1 | 7/2008 | Hotelling et al. | |
| 2009/0207151 A1 * | 8/2009 | Liu et al. | 345/174 |
| 2010/0164881 A1 * | 7/2010 | Kuo et al. | 345/173 |
| 2011/0141034 A1 * | 6/2011 | Lai et al. | 345/173 |
| 2011/0227846 A1 * | 9/2011 | Imazeki | 345/173 |
| 2011/0298739 A1 * | 12/2011 | Wu et al. | 345/173 |
| 2011/0298750 A1 * | 12/2011 | Wang | G06F 3/0412 345/174 |
| 2012/0062482 A1 | 3/2012 | Ding et al. | |
| 2012/0113032 A1 * | 5/2012 | Itakura | G06F 3/044 345/173 |
| 2013/0082961 A1 * | 4/2013 | Wang | G06F 3/044 345/173 |
| 2013/0168220 A1 * | 7/2013 | Ho et al. | 200/600 |

(Continued)

FOREIGN PATENT DOCUMENTS

WO    2014070466 A1    5/2014

OTHER PUBLICATIONS

International Search Report and Written Opinion received for PCT Patent Application No. PCT/US2013/065388, mailed on Jan. 31, 2014, 8 pages.

(Continued)

*Primary Examiner* — Amare Mengistu
*Assistant Examiner* — Crystal A Mathews

(57) ABSTRACT

A touch screen device and a method for constricting the touch screen device are provided. In some aspects, the touch screen device includes a transparent substrate. The touch screen device includes a first masking layer applied to an outer perimeter of an inner surface of the transparent substrate. The touch screen device includes a transparent conductor for a touch sensor applied to at least a portion of the first masking layer and a portion of the inner surface of the transparent substrate. The touch screen device includes a second masking layer applied to at least a portion of the transparent conductor on an inner surface of the first masking layer. The portion of the transparent conductor is arranged between the first masking layer and the second masking layer.

26 Claims, 3 Drawing Sheets

(56) References Cited

U.S. PATENT DOCUMENTS

2014/0132569 A1* 5/2014 Lien et al. ............... 345/175
2014/0225843 A1* 8/2014 Kuo ................ G06F 3/0412
                                                345/173
2014/0247226 A1* 9/2014 Chiu ............... G06F 3/0412
                                                345/173

OTHER PUBLICATIONS

International Preliminary Report on Patentability received for PCT Patent Application No. PCT/US2013/065388, mailed on May 14, 2015, 6 pages.

\* cited by examiner

MASKING AN OUTER PERIMETER OF A TOUCH SCREEN

CROSS REFERENCE TO RELATED APPLICATION

This application claims priority under 35 U.S.C. §119(e) and the benefit of U.S. Provisional Application No. 61/719,883, filed Oct. 29, 2012, and entitled, "MASKING AN OUTER PERIMETER OF A TOUCH SCREEN," the entire disclosure of which is incorporated herein by reference.

BACKGROUND

The subject technology generally relates touch screens and, in particular, relates to masking an outer perimeter of a touch screen.

A touch screen of a computing device may include a glass faceplate with a conductor arranged on an inner surface of the glass faceplate forming touch sensors to detect contact on an outer surface of the glass faceplate by a finger or a stylus. A mask of black paint or ink is typically applied around the outer perimeter on the inner surface of the glass faceplate to hide traces that connect the touch sensors to control circuitry and block the light leakage or prevent light from leaking from backlit touch screen displays. The black paint or ink must be relatively thick to block the light leakage and mask the traces. However, the transition between the thick black paint or ink and the inner surface of the glass faceplate may cause problems when applying the conductor on the inner surface of the glass faceplate to form the touch sensors. For example, a large transition may cause a break in the conductor before reaching traces formed on the applied black paint or ink.

SUMMARY

The disclosed subject matter relates to a method for constructing a touch screen device. The method includes applying a first masking layer to an outer perimeter of an inner surface of a transparent substrate. The method also includes applying a transparent conductor for a touch sensor to at least a portion of the first masking layer and at least a portion of the inner surface of the transparent substrate. The method also includes applying a second masking layer to at least a portion of the transparent conductor on an inner surface of the first masking layer. A portion of the transparent conductor is arranged between the first masking layer and the second masking layer.

The disclosed subject matter further relates to a touch screen device. The touch screen device includes a transparent substrate. The touch screen device also includes a first masking layer applied to an outer perimeter of an inner surface of the transparent substrate. The touch screen device also includes a transparent conductor for a touch sensor applied to at least a portion of the first masking layer and at least a portion of the inner surface of the transparent substrate. The touch screen device also includes a second masking layer applied to at least a portion of the transparent conductor on an inner surface of the first masking layer. The portion of the transparent conductor is arranged between the first masking layer and the second masking layer.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In some aspects, the subject technology includes painting, around an outer perimeter of an inside surface of a transparent substrate (e.g., a glass faceplate) of a touch screen, a first layer of black paint that is thick enough to mask traces of the touch screen but may not be thick enough to block light leakage or prevent light from leaking. The subject technology includes applying a conductor over the first layer of black paint being used to cover traces that are visible to the human eye. Other traces, that are not covered, may not be visible to the human eye. The traces of the touch screen that are covered due to the visibility of the traces to the human eye may be positioned on the first layer of black paint. The subject technology includes applying a second layer of black paint over the conductor that is thick enough to block the light leakage or prevent light from leaking. The unpainted portion of the conductor can be positioned so that the transition between the black paint and the unpainted portion of the touch screen falls across the widest portion of the conductor shapes. The traces that are visible to the human eye do not extend into the unpainted portion of the conductor.

Advantageously, according to some aspects of the subject technology, a total thickness of paint on the outer perimeter of the touch screen may be thick enough to block light. However, the thickness of a layer of paint between the traces and the transparent substrate may be less than the total thickness of the paint on the outer perimeter. As a result, problems when applying the conductor on the inner surface of the transparent substrate to form the touch sensors may be reduced. For example, a large transition causing a break in the conductor before reaching traces formed on the paint may be reduced.

Figure 1:
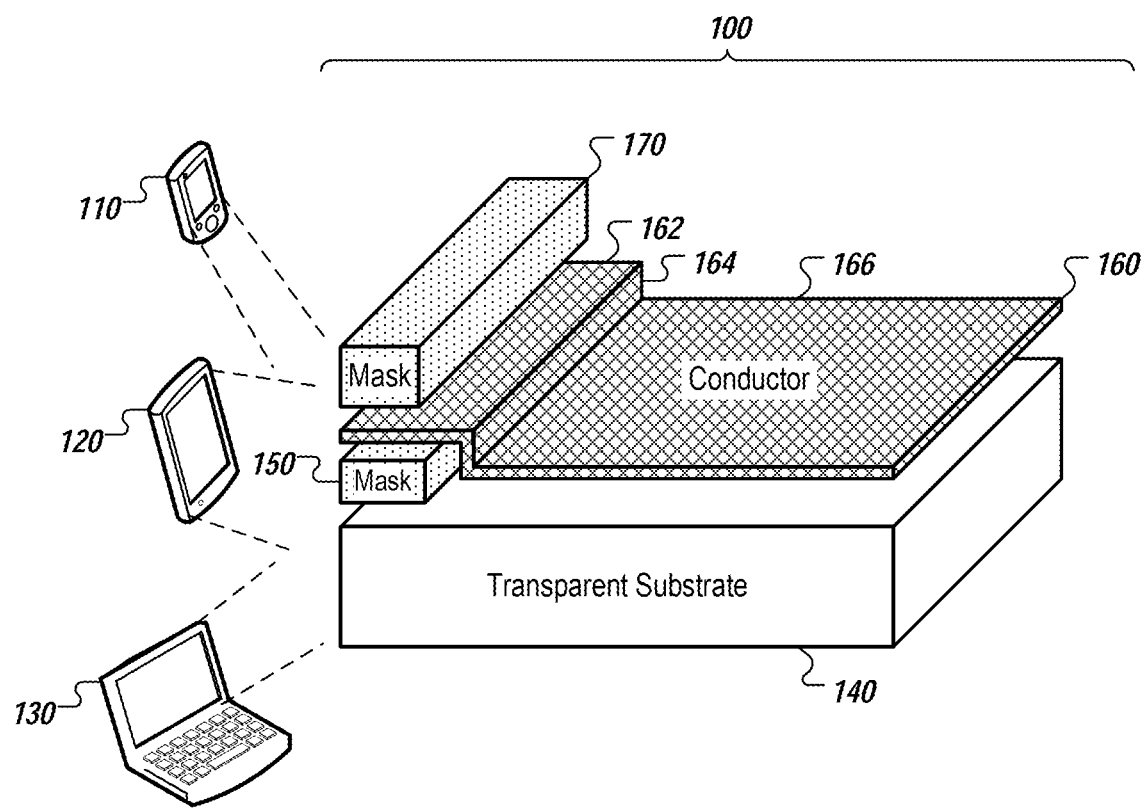
FIG. 1 is a schematic diagram that shows examples of touch screen devices and a side view of a portion of a touch screen.

FIG. 1 is a schematic diagram that shows examples of touch screen devices 110, 120, and 130, and a side view of a portion of a touch screen 100.

The touch screen 100, as described herein, may be included in various devices, for example, a personal digital assistant (PDA) 110, a tablet computer 120, or a laptop computer 130. The touch screen 100 may also be included in one or more of a mobile phone, a digital audio player, a desktop computer, a kiosk, an automatic teller machine (ATM), etc.

As shown, the touch screen 100 includes a transparent substrate 140, a first masking layer 150, a conductor 160, and a second masking layer 170.

The conductor 160 forms touch sensors configured to detect contact (e.g., via a finger or a stylus) on the transparent substrate 140. Image data is displayed through the transparent substrate 140. The transparent substrate 140 may be made of glass, plastic, a polycarbonate substrate, or other material(s). In some examples, the glass may be hardened, for example by replacing sodium ions in the glass with potassium ions, to increase the strength of the glass. Increasing the strength of the glass may be important, for example, if a touch screen device, such as a mobile phone, a tablet computer, or a digital audio player is placed in a pocket or a purse with other items that may scratch or break the glass, for example, keys or coins.

The conductor 160 is applied to an inner surface of the transparent substrate 140. The conductor 160 also is applied to at least a portion of the first masking layer 150. The conductor forms a touch sensor or array of touch sensors. In other words, the conductor 160 is configured to receive touch information and to transmit or facilitate transmission of touch information to a touch screen controller within the device containing the touch screen (e.g., device 110, 120, or 130). When an outer surface (the side not including the conductor 160) of the transparent substrate 140 is touched by a touching device, for example a finger or a stylus, an amount of charge on the conductor 160 at the location of contact is changed, and a signal indicating the touching is transmitted via the conductor 160. The conductor 160 may be a transparent conductor, such as indium tin oxide (ITO), allowing images to be displayed through the conductor 160 and the transparent substrate 140. The thickness of the conductor 160 may be 0.05 micrometers or approximately 0.05 micrometers, i.e., within 5% of 0.05 micrometers, within 10% of 0.05 micrometers, within 20% of 0.05 micrometers, etc.

As illustrated, the conductor 160 includes an outer perimeter portion 162, an elevation change portion 164, and a central portion 166. The central portion 166 is applied to the transparent substrate 140. The outer perimeter portion 162 is applied to the first masking layer 150, described below. The elevation change portion 164 corresponds to a change in elevation between the first masking layer 150 and the transparent substrate 140. One or more traces (for example, as described in greater detail below) may connect to the conductor 160 at the outer perimeter portion 162.

The first masking layer 150 is applied to an outer perimeter of an inner surface of the transparent substrate 140, allowing the conductor 160 to be applied to a portion of the first masking layer 150 and a portion of the inner surface of the transparent substrate 140. The first masking layer 150 resides near the outer perimeter of the transparent substrate 140 and the conductor 160, arranged between the transparent substrate 140 and the conductor 160. The first masking layer 150 includes an opaque material, for example, ink or paint. The first masking layer is configured to mask at least a portion of the traces, for example, traces that reside adjacent to the outer perimeter portion 162 of the conductor 160 or traces that reside at other positions. The traces and the conductor 160 are made of different materials. For example, the traces are made of metal or a metal alloy, which is opaque and requires the use of the first masking layer 150 or so that the user cannot see the traces. The conductor can be a thin layer of indium tin oxide (ITO), which is transparent and not easily visible to the user. As a result of a thickness of the first masking layer 150, the traces are less visible or not visible to a user of the touch screen 100. In some examples, the first masking layer 150 is not thick enough to prevent light from the inner surface (corresponding to the side of the touch screen that is not exposed to the external environment) of the first masking layer 150 from passing through the first masking layer 150 to be seen by a user of the touch screen 100, who is viewing the touch screen 100 from the outer surface (corresponding to the side of the touch screen that is exposed to the external environment). However, the combination of the first masking layer 150 and the second masking layer 170 is thick enough is thick enough to prevent light from the inner surface of the second masking layer 170 from passing though the first masking layer 150 and the second masking layer 170 to be seen by the user of the touch screen 100. The first masking layer 150 has a thickness that allows the transparent conductor 160 to make an electrical connection across the elevation change portion 164 of the masking layer 160 and the inner surface of the transparent substrate 140. As a result, the conductor 160 can transmit touch data from anywhere on the conductor 160 to the traces that reside adjacent to the outer perimeter portion 162. The elevation change in elevation change portion 164 of the conductor 160, which is due to the first masking layer 150, is not large enough to cause a break in the electrical connection of the conductor. The thickness of the first masking layer 150, corresponding to the elevation change of the elevation change portion 164 of the conductor 160, may be one micrometer or approximately one micrometer, i.e., within 5% of one micrometer, within 10% of one micrometer, within 20% of one micrometer, etc.

The second masking layer 170 resides on or is applied to the inner surface of an outer perimeter portion 162 of the conductor 160 and on an inner surface of the first masking layer 150. The second masking layer 170 includes an opaque material, for example, ink or paint. The first masking layer 150 and the second masking layer 170 may include the same material, which may have a black color. Alternatively, a material of any other color (e.g., dark blue or grey) may be used or the first masking layer 150 and the second masking layer 170 may include different materials. Either the first masking layer 150 or a combination of the first masking layer 150 and the second masking layer 170 have a thickness that blocks light from a display device inside the inner surface of the transparent substrate 140 and the conductor 160 from being transmitted through the first masking layer 150 and the second masking layer 170 to the outer surface of the transparent substrate 140. The thickness of the second masking layer may be between 11 and 14 micrometers, between 10 and 15 micrometers, between 9 and 16 micrometers, between 8 and 17 micrometers, etc. The second masking layer 170 may be thicker than the first masking layer 150.

Figure 2:
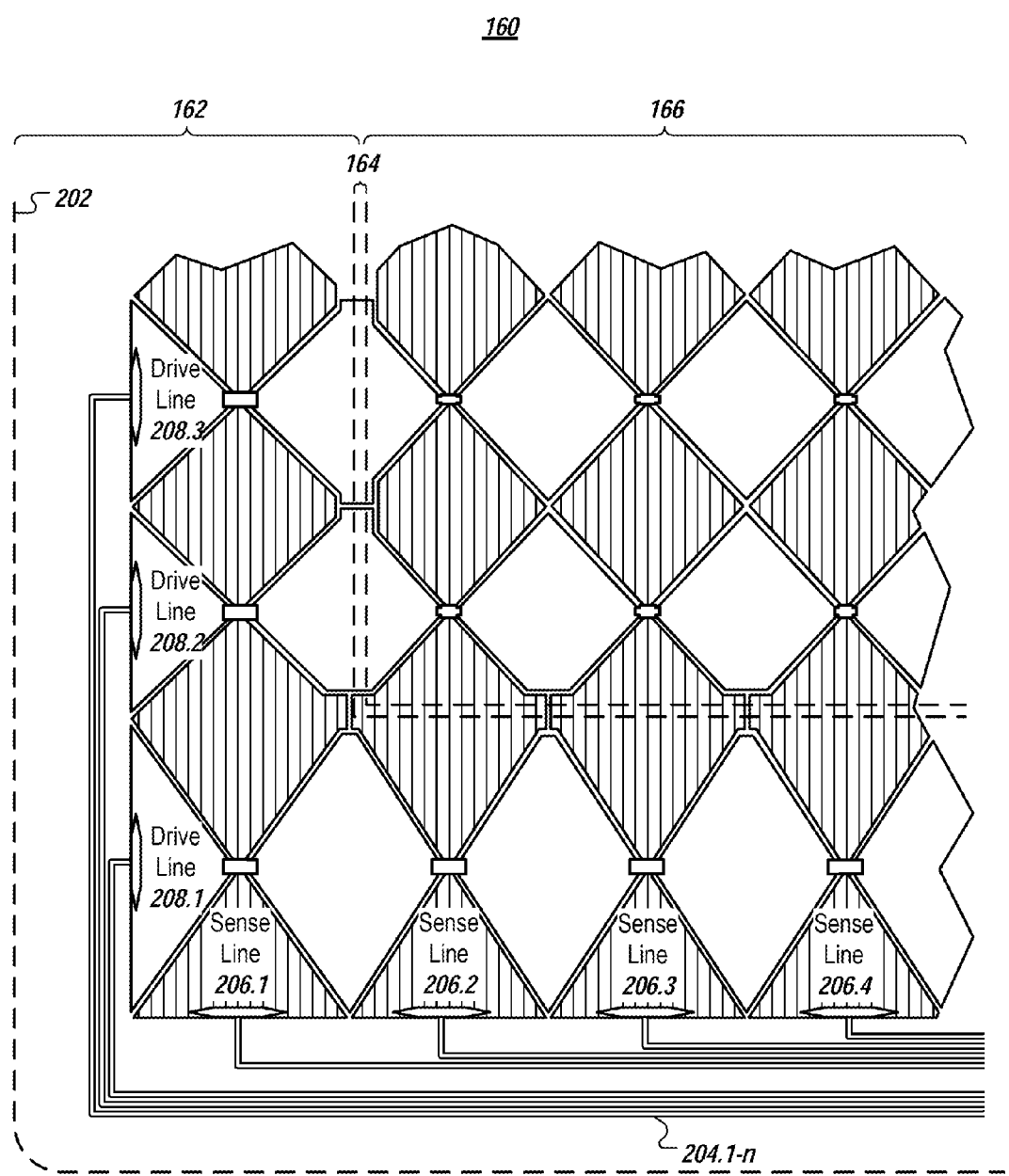
FIG. 2 is a schematic diagram that shows an example of a portion of a conductor and placement of masking layers for a touch screen.

FIG. 2 is a schematic diagram that shows an example of a portion of a conductor 160 and placement of masking layers for a touch screen.

The conductor 160 includes an outer perimeter portion 162, an elevation change portion 164, and a central portion 166. The outer perimeter portion 162 is placed between the first masking layer 150 and the second masking layer 170. The central portion 166 overlays the transparent substrate 140. The elevation change portion 164 corresponds to a portion of the conductor 160 between the outer perimeter portion 162 and the central portion 166 where an elevation of the conductor 160 changes due to the "drop" at the edge of the first masking layer 150.

The outer dashed lines 202 correspond to an outer perimeter of the first masking layer 150 and the second masking layer 170. Trace lines 204.1-n connect to the conductor 160 at the ends of the drive lines 208.1-3 and the ends of the sense lines 206.1-4. The thickness of the first masking layer 150 blocks the trace lines 204.1-n or makes more difficult for the trace lines 204.1-n to be seen (e.g., by a user of the touch screen 100) from an outer surface of the transparent substrate 140. The trace lines 204.1-n are formed on the inner surface of the first masking layer 150.

The conductor 160 includes drive lines 208.1-3 and sense lines 206.1-4 for transmitting touch information across the conductor to the traces 204.1-n, which receive the touch information. While three drive lines 208.1-3 and four sense lines 206.1-4 are illustrated, the subject technology may be implemented with any number of drive lines and/or sense lines. The drive lines 208.1-3 or the sense lines 206.1-4 may include indium tin oxide (ITO) or another transparent conductive material. In some aspects, wide portions of the sense lines 206.2, 206.3, and 206.4 and wide portions of drive lines 208.2 and 208.3 may lie across the elevation change portion 164 of the first masking layer 150. In some examples, the drive lines 208.1-3 and the sense lines 206.1-4 may run perpendicular or roughly perpendicular (e.g., between 75 degrees and 105 degrees) to one another. In some examples, the drive lines 208.1-3 and the sense lines 206.1-4 include conductive pathways that are not necessarily linear.

Drive lines 208.1-3 may be coupled with sense lines 206.1-4 at detection points, corresponding to intersections of drive lines 208.1-3 and sense lines 206.1-4. Touch events may be detected at detection points. In some implementations, multiple touch events, at multiple different detection points, may be detected simultaneously. When a touch screen is activated (e.g., when a mobile phone implementing a touch screen is unlocked), a stimulus waveform may be applied to each drive line 208.1-3 to allow the drive line 208.1-3 to detect and respond to touch event(s) on the drive line 208.1-3.

Figure 3:
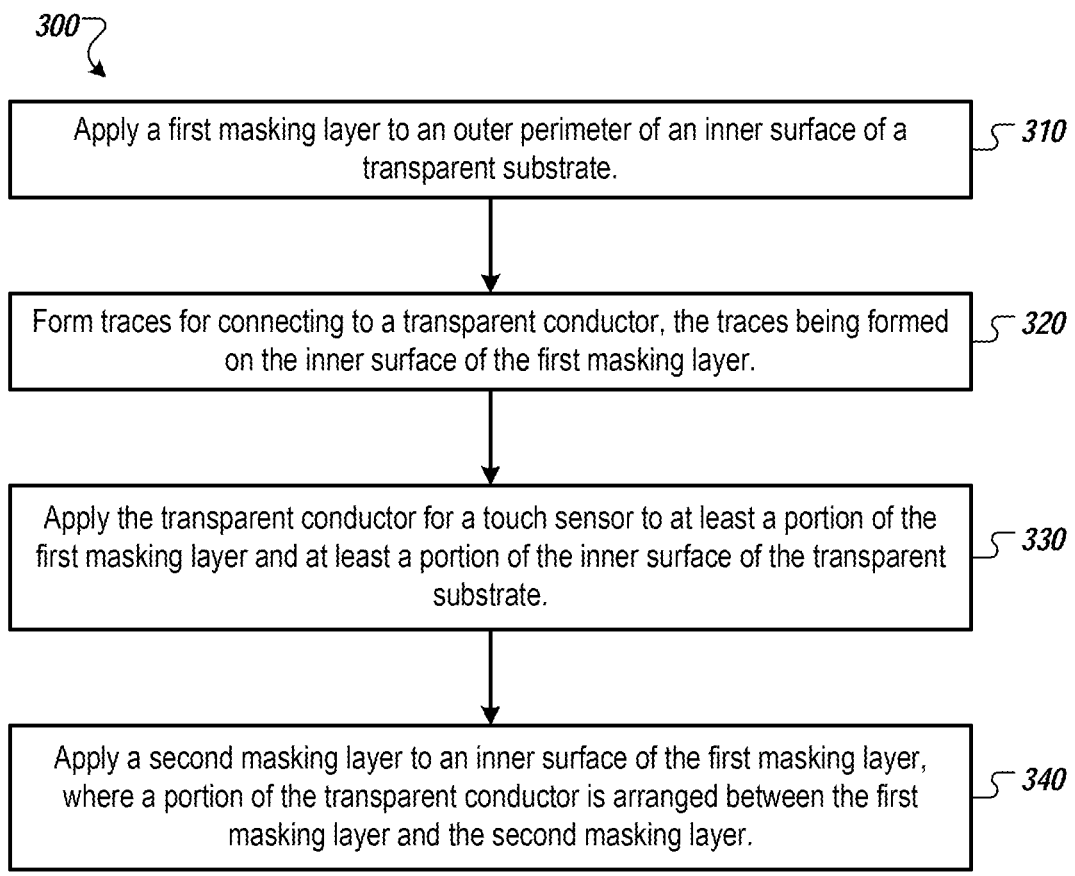
FIG. 3 illustrates an example process by which a mask may be applied to an outer perimeter of a touch screen.

FIG. 3 illustrates an example process 300 by which a mask may be applied to an outer perimeter of a touch screen.

The process 300 begins at step 310, where a manufacturer (e.g., a manufacturing machine, a worker on an assembly line, etc.) applies a first masking layer (e.g., first masking layer 150) to an outer perimeter of an inner surface of a transparent substrate (e.g., transparent substrate 150). The first masking layer may be applied using a lithographic process.

In step 320, the manufacturer forms traces (e.g., trace line 204.1-n) for connecting to a transparent conductor. The manufacturer forms the traces on the inner surface of the first masking layer. The traces are for receiving touch information from the transparent conductor (e.g., via drive lines or sense lines of the transparent conductor).

In step 330, the manufacturer applies the transparent conductor (e.g., conductor 160) for a touch sensor to at least a portion of the first masking layer and at least a portion of the inner surface of the transparent substrate. The thickness of the transparent conductor may be 0.05 micrometers or approximately 0.05 micrometers, i.e., within 5% of 0.05 micrometers, within 10% of 0.05 micrometers, within 20% of 0.05 micrometers, etc.

The first masking layer may be applied at a thickness that allows the transparent conductor to make an electrical connection across an elevation change region of the portion of the first masking layer and the portion of the inner surface of the transparent substrate. The thickness of the first masking layer may prevent the traces that connect to the transparent conductor and are formed on the inner surface of the first masking layer from being seen from an outer surface of the transparent substrate, from where a user may be viewing the touch screen. The thickness of the first masking layer may be one micrometer or approximately one micrometer, i.e., within 5% of one micrometer, within 10% of one micrometer, within 20% of one micrometer, etc.

In step 340, the manufacturer applies a second masking layer (e.g., second masking layer 170) to an inner surface of the first masking layer. A portion of the transparent conductor is arranged between the first masking layer and the second masking layer. The second masking layer may be applied using a screen printing process. The second masking layer may be thicker than the first masking layer. The thickness of the second masking layer may be between 10 and 15 micrometers or between 9 and 16 micrometers.

The second masking layer may be applied at a thickness that allows the second masking layer, in conjunction with the first masking layer, to block light from a display device inside the inner surface of the transparent substrate from being transmitted through the first masking layer and the second masking layer to the outer surface of the transparent substrate, from where a user may be viewing the touch screen. After step 340, the process 300 ends.

The steps 310-340 in the process 300 may be carried out in any order, not necessarily in the order described herein. For example, the step 330 may be carried out before or after the step 320. In some implementations, two or more of the steps 310-340 may be carried out in parallel.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method for constructing a touch screen device, the method comprising:
    applying a first masking layer to an outer perimeter of an inner surface of a transparent substrate;
    applying a transparent conductor for a touch sensor to at least a portion of the first masking layer and at least a portion of the inner surface of the transparent substrate; and
    applying a second masking layer to an inner surface of the first masking layer, but not to the transparent conductor that is applied to the transparent substrate, wherein a portion of the transparent conductor is arranged between the first masking layer and the second masking layer.

2. The method of claim 1, wherein the second masking layer is thicker than the first masking layer.

3. The method of claim 1, further comprising:
forming traces that connect to the transparent conductor, the traces being formed on the inner surface of the first masking layer.

4. The method of claim 3, wherein the traces are for receiving touch information from the transparent conductor.

5. The method of claim 3, wherein applying the first masking layer comprises applying the first masking layer at a thickness that allows the transparent conductor to make an electrical connection across an outer perimeter of the portion of the first masking layer and the portion of the inner surface of the transparent substrate.

6. The method of claim 5, wherein the first masking layer prevents the traces that connect to the transparent conductor from being visible from an outer surface of the transparent substrate.

7. The method of claim 6, wherein applying the second masking layer comprises applying the second masking layer at a thickness that blocks light from a display device inside the inner surface of the transparent substrate from being transmitted through the second masking layer and the first masking layer to the outer surface of the transparent substrate.

8. The method of claim 7, wherein the thickness of the first masking layer is about one micrometer.

9. The method of claim 8, wherein the thickness of the second masking layer is about ten to fifteen micrometers.

10. The method of claim 7, further comprising using a lithographic process to apply the first masking layer.

11. The method of claim 10, further comprising using a screen printing process to apply the second masking layer.

12. A touch screen device comprising:
a transparent substrate;
a first masking layer applied to an outer perimeter of an inner surface of the transparent substrate;
a transparent conductor for a touch sensor applied to at least a portion of the first masking layer and at least a portion of the inner surface of the transparent substrate; and
a second masking layer applied to at least a portion of the transparent conductor on an inner surface of the first masking layer, but not applied to the transparent conductor that is applied to the transparent substrate, wherein the at least the portion of the transparent conductor is arranged between the first masking layer and the second masking layer.

13. The touch screen device of claim 12, wherein the second masking layer is thicker than the first masking layer.

14. The touch screen device of claim 12, further comprising:
traces that connect to the transparent conductor, the traces being formed on the inner surface of the first masking layer.

15. The touch screen device of claim 14, wherein the traces are for receiving touch information from the transparent conductor.

16. The touch screen device of claim 14, wherein the first masking layer has a thickness that allows the transparent conductor to make an electrical connection across an elevation change region of the portion of the first masking layer and the portion of the inner surface of the transparent substrate.

17. The touch screen device of claim 16, wherein the thickness of the first masking layer prevents the traces formed on the inner surface of the first masking layer from being seen from an outer surface of the transparent substrate.

18. The touch screen device of claim 17, wherein the second masking layer has a thickness that blocks light from a display device inside the inner surface of the transparent substrate from being transmitted through the second masking layer to the outer surface of the transparent substrate.

19. The touch screen device of claim 18, wherein the thickness of the first masking layer is about one micrometer.

20. The touch screen device of claim 18, wherein the thickness of the second masking layer is about ten to fifteen micrometers.

21. The touch screen device of claim 16, wherein the transparent conductor comprises sense and drive lines, and wherein wide portions of the sense and drive lines are configured to lie across the elevation change region of the portion of the first masking layer.

22. The touch screen device of claim 21, wherein the sense and drive lines comprise indium tin oxide.

23. The touch screen device of claim 16, wherein the first masking layer and the second masking layer comprise a same material.

24. The touch screen device of claim 23, wherein the same material has a black color.

25. The touch screen device of claim 16, wherein the first masking layer and the second masking layer comprise different materials.

26. The touch screen device of claim 16,
wherein the transparent conductor includes a plurality of drive lines and a plurality of sense lines for transmitting touch information across the conductor to the traces, the drive lines and the sense lines being substantially perpendicular to each other,
wherein the drive lines include a first pattern of wide portions and narrow portions and the sense lines include a second pattern of wide portions and narrow portions, and
wherein wide portions of the first pattern or wide portions of the second pattern lie across the elevation change region.

* * * * *